(12) United States Patent
Tominaga et al.

(10) Patent No.: US 6,741,549 B2
(45) Date of Patent: May 25, 2004

(54) OPTICAL RECORDING MEDIUM AND OPTICAL RECORDING AND REPRODUCTION APPARATUS

(75) Inventors: Junji Tominaga, 26-414-3, Matsushiro 4-Chome, Tsukuba-shi, Ibaraki 305-0035 (JP); Jooho Kim, Tsukuba (JP); Nobufumi Atoda, Tsukuba (JP); Hiroshi Fuji, Soraku-gun (JP); Hiroyuki Katayama, Nara (JP)

(73) Assignees: Sharp Kabushiki Kaisha, Osaka (JP); National Institute of Advanced Industrial Science and Technology, Tokyo (JP); Junji Tominaga, Ibaraki (JP)

( * ) Notice: Subject to any disclaimer, the term of this patent is extended or adjusted under 35 U.S.C. 154(b) by 134 days.

(21) Appl. No.: 09/922,026

(22) Filed: Jul. 10, 2001

(65) Prior Publication Data

US 2002/0067690 A1 Jun. 6, 2002

(30) Foreign Application Priority Data

Jul. 13, 2000 (JP) ........................................ 2000-213180

(51) Int. Cl.$^7$ .............................. G11B 3/70; G11B 5/84; G11B 7/26; G11B 11/00
(52) U.S. Cl. ..................................... 369/285; 369/13.02
(58) Field of Search .............................. 369/285, 275.1, 369/126, 284, 283, 286, 275.2, 275.4, 275.5, 278, 13.02, 300, 13.33, 13.35, 13.01, 13.38, 13.46, 13.51, 13.26, 272

(56) References Cited

U.S. PATENT DOCUMENTS

| | | | | |
|---|---|---|---|---|
| 5,600,612 A | * | 2/1997 | Saito et al. | 369/13.02 |
| 5,968,678 A | * | 10/1999 | Tanase et al. | 428/694 ML |
| 5,982,715 A | * | 11/1999 | Mori et al. | 369/13.38 |
| 6,101,154 A | * | 8/2000 | Kim | 369/13.24 |
| 6,111,823 A | * | 8/2000 | Kim | 369/13.24 |
| 6,147,939 A | * | 11/2000 | Takahashi et al. | 369/13.43 |
| 6,177,166 B1 | * | 1/2001 | Ohno et al. | 428/64.1 |
| 6,177,167 B1 | * | 1/2001 | Yuzurihara et al. | 428/64.1 |
| 6,261,707 B1 | * | 7/2001 | Murakami et al. | 428/694 ML |
| 6,340,555 B1 | * | 1/2002 | Miyamoto et al. | 430/270.13 |
| 6,411,591 B1 | * | 6/2002 | Moritani et al. | 369/275.2 |

(List continued on next page.)

FOREIGN PATENT DOCUMENTS

JP 6-36343 A * 2/1994

OTHER PUBLICATIONS

Tominaga et al, "An approach for recording and readout beyond the diffraction limit with an Sb thin film", Oct. 12, 1998, Applied Physics Letters, v. 73, No. 15, pp. 2078–2080.*

U.S. patent application Ser. No. 09/537,235, J. Tominaga et al., filed Mar. 28, 2000.

(List continued on next page.)

*Primary Examiner*—Julie Anne Watko
(74) *Attorney, Agent, or Firm*—Edwards & Angell, LLP; David G. Conlin; George W. Hartnell, III (57) ABSTRACT

An optical recording medium in accordance with the present invention is provided with a substrate, a mask layer, provided on the substrate, whose index of refraction changes due to light or heat of the substrate, and a recording layer that is provided away from the mask layer by a distance that is not more than a distance which allows the near-field light to reach. The mask layer generates a minute opaque region in a light spot and the recording layer is a magneto-optical layer. An optical recording and reproduction apparatus in accordance with the present invention uses the optical recording medium. This allows to provide an optical recording medium and an optical recording and reproduction apparatus that can suppress the erasure of recorded marks and carry out the reproduction again and again.

20 Claims, 4 Drawing Sheets

U.S. PATENT DOCUMENTS

| | | | | |
|---|---|---|---|---|
| 6,418,088 | B1 | * | 7/2002 | Takagi et al. ............ 369/13.02 |
| 6,456,584 | B1 | * | 9/2002 | Nagata et al. ............ 369/275.2 |
| 6,477,118 | B1 | * | 11/2002 | Awano et al. ............ 369/13.14 |
| 6,511,788 | B1 | * | 1/2003 | Yasuda et al. ......... 430/270.13 |
| 6,661,745 | B1 | * | 12/2003 | Tominaga et al. ....... 369/13.33 |
| 2003/0218969 | A1 | * | 11/2003 | Tsai et al. ................... 369/288 |

OTHER PUBLICATIONS

U.S. patent application Ser. No. 09/585,554, J. Tominaga et al., filed Jun. 02, 2000.

*A Near–Field Recording and Readout Technology Using a Metallic Probe in an Optical Disk*, H. Fuji, et al., Jpn. J. Appl. Phys. vol. 39 (2000) pp. 980–981, Part 1, No. 2B, Feb. 2000.

*Magneto–optical disk properties enhanced by a nonmagnetic mask layer*, J.H. Kim, et al., Appl. Physics Letters, vol. 77, No. 12 (Sep. 18, 2000) pp. 1774–1776.

*Super–Resolution Readout Using a Silver Scattering Center with Plasmon Excitation Generated in a Non–Magnetic Readout Layer*, H. Fuji, et al., J. Magn. Soc. Japan, vol. 25, No. 3–2 (2001) pp. 383–386.

*Improvement of Super–RENS MO Disk Characteristics by Optimized Super–Resolution Near–Field Structure*, J. Kim, et al., J. Magn. Soc. Japan, vol. 25, No. 3–2, (2001) pp. 387–390.

* cited by examiner

PRIOR ART

OPTICAL RECORDING MEDIUM AND OPTICAL RECORDING AND REPRODUCTION APPARATUS

FIELD OF THE INVENTION

The present invention relates to an optical recording medium and an optical recording and reproduction apparatus that use a near-field light so as to realize a recording density which is beyond the diffraction limit of the light.

BACKGROUND OF THE INVENTION

Recently, a variety of systems for carrying out a high-density recording by using the near-field light have been developed. For example, Japanese Journal Applied Physics, vol.39(2000), Part 1, No. 2B, pp.980–981, Part 1, No. 2B, February 2000, discloses readout method and writing method for an optical memory by use of the near-field light. The following description deals with such an art with reference to FIG. 4.

Figure 4:
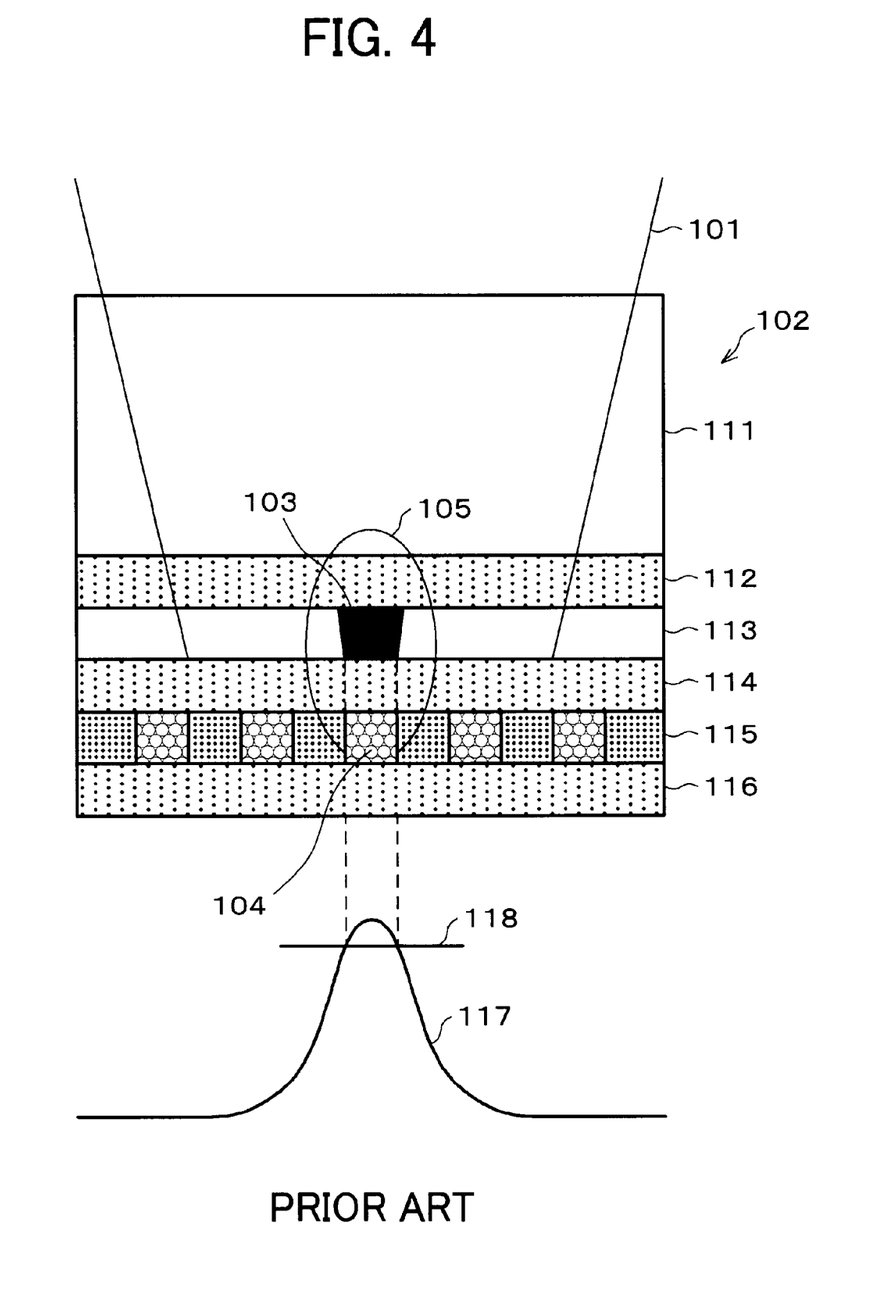
FIG. 4 is an explanatory diagram showing a structure of a conventional optical recording medium.

A light beam (laser beam) 101 converged by an object lens (not shown) is directed (projected) to an optical disk 102. The optical disk 102 is arranged so that a protection layer 112, a mask layer 113, a protection layer 114, a recording layer 115, and a protection layer 116 are provided on a disk substrate 111 in this order. Each thickness of the respective layers are as follows. More specifically, the disk substrate 111 has a thickness of 0.6 mm, the protection layer 112 has a thickness of 170 nm, the mask layer 113 has a thickness of 15 nm, the protection layer 114 has a thickness of 40 nm, the recording layer 115 has a thickness of 15 nm, and the protection layer 116 has a thickness of 20 nm.

$Ge_2Sb_2Te_5$, that is a material of phase transition type, is used as the recording layer 115. A silver oxide layer is used as the mask layer 113. The light beam 115 causes the mask layer 113 to have a temperature distribution 117 shown in FIG. 1.

Silver oxide decomposes and the silver is deposited around a center portion of the light beam spot whose temperature is beyond a threshold temperature 118 in the temperature distribution 117. The deposition of silver causes each index of refraction in such a portion to change so as to provide in the mask layer 113 a scatterer 103 whose diameter is smaller than that of the light beam spot. This allows to generate a near-field light 105 around the scatterer 103. The near-field light 105 interacts with a mark 104 that has been recorded in the recording layer 115 so as to generate a propagation light. One part of the propagation light is readout as the reflection light. The protection layer 114 is set so that its thickness is equal to a distance that is not more than a distance which allows the near-field light 105 derived from the scatterer 103 to reach the recording layer 115. This allows to record or reproduce a record mark of not more than 100 nm.

However, the foregoing conventional art has the following problem. More specifically, the distance between the mask layer 113 and the recording layer 115 is short so as to cause the phase transition due to the thermal interference. This causes the recorded mark to be erased.

More specifically, in order for the mask layer 113 to have the scatterer 103, it is necessary to raise the temperature of the mask layer 113 to be not less than the threshold temperature 118. However, the distance between the mask layer 113 and the recording layer 115 is short so as to cause the heat of the mask layer 113 to be conducted to the recording layer 115 with ease. This allows the parts other than the recorded mark 104 to have the phase transition and the crystallization, thereby raising the problem that the recorded signal is gradually erased.

SUMMARY OF THE INVENTION

In view of the foregoing problem, the present invention is made, and its object is to provide an optical recording medium and an optical recording and reproduction apparatus that can avoid the erasure of the recorded mark and that can carry out the reproduction again and again.

In order to achieve the foregoing object, an optical recording medium in accordance with the present invention has a mask layer that changes in its index of refraction at a temperature of not less than a threshold temperature, and a recording layer that is provided away from the mask layer by a distance that is not more than a distance which allows a near-field light to reach, the recording layer being a magnetic layer.

With the optical recording medium, since the recording layer is a magnetic layer, information is magnetically recorded. Accordingly, even when the distance between the mask layer and the recording layer is short so as to cause the thermal interference, the information that has been recorded is not affected. Namely, the information that has been recorded is not changed as long as a magnetic field is not applied thereto. This ensures to avoid the conventional problem that the information that has been recorded is gradually erased.

The reproduction of the information is carried out as follows. More specifically, when the mask layer has a temperature rise, the temperature rise portion whose temperature is not less than the threshold temperature changes in its index of refraction so as to generate the near-field light around the portion in which the index of refraction is changed. Since the recording layer is provided away from the mask layer by the distance that is not more than a distance which allows the near-field light to reach, the near-field light interacts with the recording layer and is scattered. The scattered light (propagation light) is partially reflected so as to generate the reflected light. The information is reproduced in accordance with the reflected light.

Note that when the temperature of the temperature rise portion becomes lower than the threshold temperature, the portion whose index of refraction has changed returns to the previous index of refraction (the original index of refraction). In response to the moving of the temperature rise portion in the mask layer, the portion whose index of refraction changes is moved. This allows to carry out the reproduction again and again by use of the near-field light.

It is preferable that the magnetic layer is a magneto-optical recording layer. In this case, the recording of the information is carried out as follows. More specifically, the temperature of a recorded portion is raised so that the coercive force of the magneto-optical recording layer becomes substantially zero. Then, an external magnetic field is applied so as to reverse the direction of the magnetization of the recorded portion. Thus, the recording of the information is carried out.

During the reproduction of the information, the information that has been recorded in the magneto-optical recording layer is not changed as long as the external magnetic field is not applied thereto, even when the distance between the mask layer and the recording layer is short so as to cause the thermal interference therebetween. Namely, even when the temperature rise occurs in the recording layer during the reproduction, there is no reverse of magnetization in the recorded portion and the portions other than the recorded portion as long as the external magnetic field is not applied. This ensures to avoid that the recorded information is gradually erased.

In order to achieve the foregoing object, an optical recording and reproduction apparatus in accordance with the present invention uses the above optical recording medium and has (a) temperature rise means for raising the temperature of the optical recording medium, (b) temperature control means for controlling the temperature rise means so that the temperature rise during the reproduction is lower than that during the recording and so that the recording is not carried out with respect to the recording layer, (c) magnetic field generating means for generating a recording magnetic field that varies depending on the information to be recorded, and for applying the recording magnetic field to the optical recording medium, and (d) reproduction means for detecting a polarized component of light that has reflected from or transmitted through the optical recording medium so as to reproduce the information.

With the optical recording and reproduction apparatus, the magnetic field from the magnetic field generating means is applied to a target portion of the magnetic layer, thereby carrying out the recording. Meanwhile, during the reproduction, the temperature rise means is controlled by the temperature control means so that the temperature rise during the reproduction is lower than that of the recording. During this, the magnetization of the recording layer is not affected by the temperature rise. The temperature rise causes the index of refraction of the portion whose temperature is not less than the threshold temperature to change so that the near-field light is generated around the portion in which the index of refraction has changed. Since the recording layer is provided away from the mask layer by a distance that is not more than a distance which allows the near-field light to reach, the near-field light interacts with the recording layer and is scattered. The scattered light (propagation light) is partially reflected so as to generate the reflected light. The polarized component of the reflected light is detected by the reproduction means, thereby reproducing the information that has been recorded. Instead of the reflected light, the transmitted light may be detected to reproduce the information. During the reproduction, it does not occur that the magnetic field from the magnetic field generating means is applied to the optical recording medium.

Meanwhile, in the case where the magnetic layer is a magneto-optical recording layer, when the temperature rise occurs in the magneto-optical recording medium due to the temperature rise means, a portion, in the recording layer, whose coercive force becomes substantially zero occurs. When the magnetic field is applied to such a portion by the magnetic field generating means, the magnetization of such a portion is reversed, thereby carrying out the recording.

In contrast, the following procedure is carried out during the reproduction. More specifically, the temperature rise means is controlled by the temperature control means so that the temperature rise during the reproduction is lower than that of the recording. During this, the magnetization of the recording layer is not affected by the temperature rise. The temperature rise causes the index of refraction of the portion whose temperature is not less than the threshold temperature to change so that the near-field light is generated around the portion in which the index of refraction has changed. Since the recording layer is provided away from the mask layer by a distance that is not more than a distance which allows the near-field light to reach, the near-field light interacts with the recording layer and is scattered. The scattered light (propagation light) is partially reflected so as to generate the reflected light. The reproduction of the information is carried out in accordance with the reflected light. During the reproduction, it does not occur that the magnetic field from the magnetic field generating means is applied to the magneto-optical recording medium.

Accordingly, with the optical recording and reproduction apparatus, even when the distance between the mask layer and the recording layer is short so as to cause the thermal interference, the information that has been recorded is not affected. This is because, during the reproduction, the magnetization of the recording layer is not affected by the temperature rise and the magnetic field from the magnetic field generating means is not applied to the magneto-optical recording medium. Namely, even when the temperature rise occurs in the recording layer during the reproduction, since the magnetization of the recording layer is not affected by the temperature rise and the magnetic field is not applied to the magnetic layer, there is no reverse of magnetization in the recorded portion and the portions other than the recorded portion. This ensures to overcome the conventional deficiency that the information that has been recorded is gradually erased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

DESCRIPTION OF THE EMBODIMENTS

Figure 1:
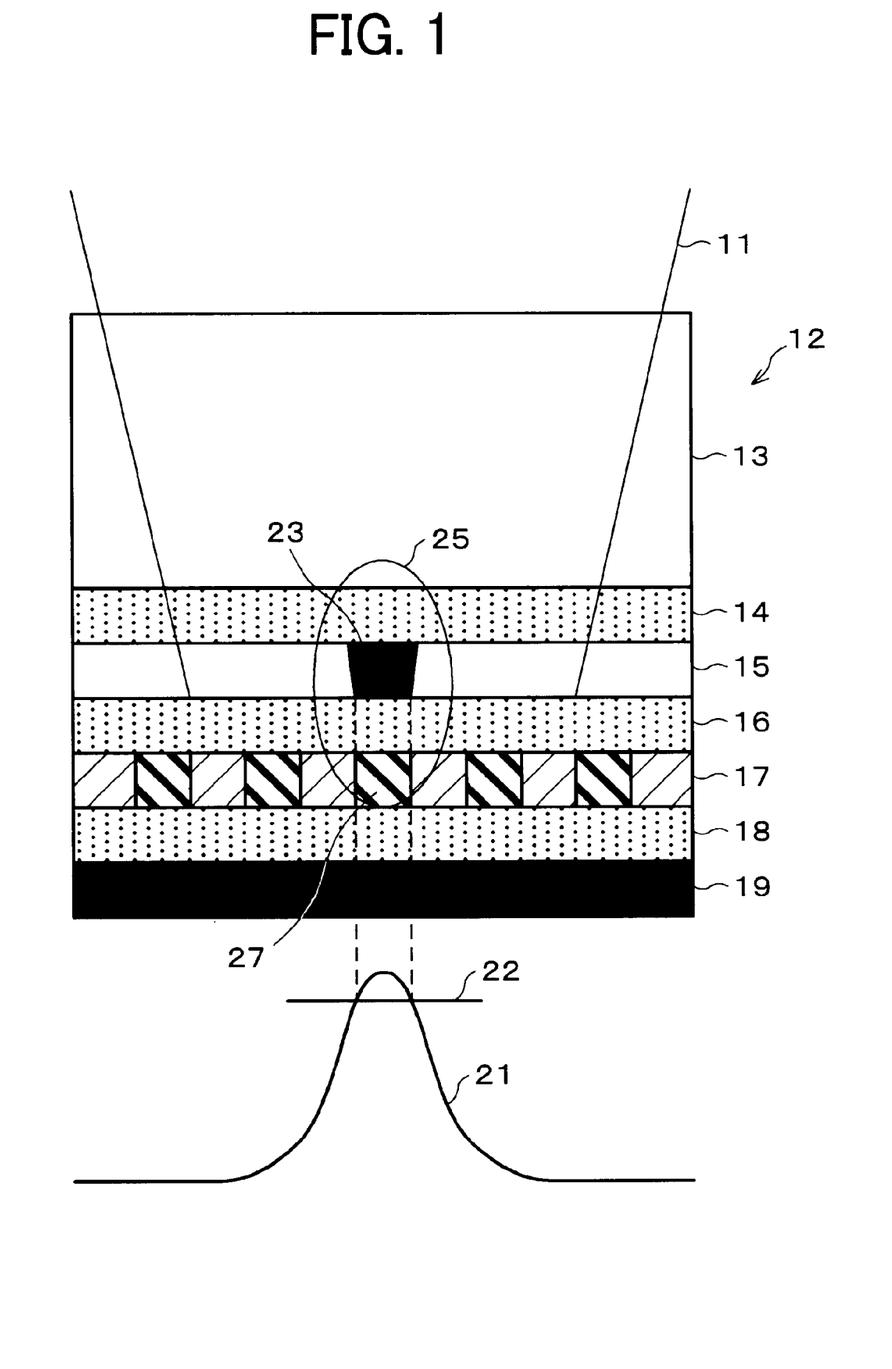
FIG. 1 is an explanatory diagram showing a structure of an optical recording medium in accordance with the present invention.
Figure 2:
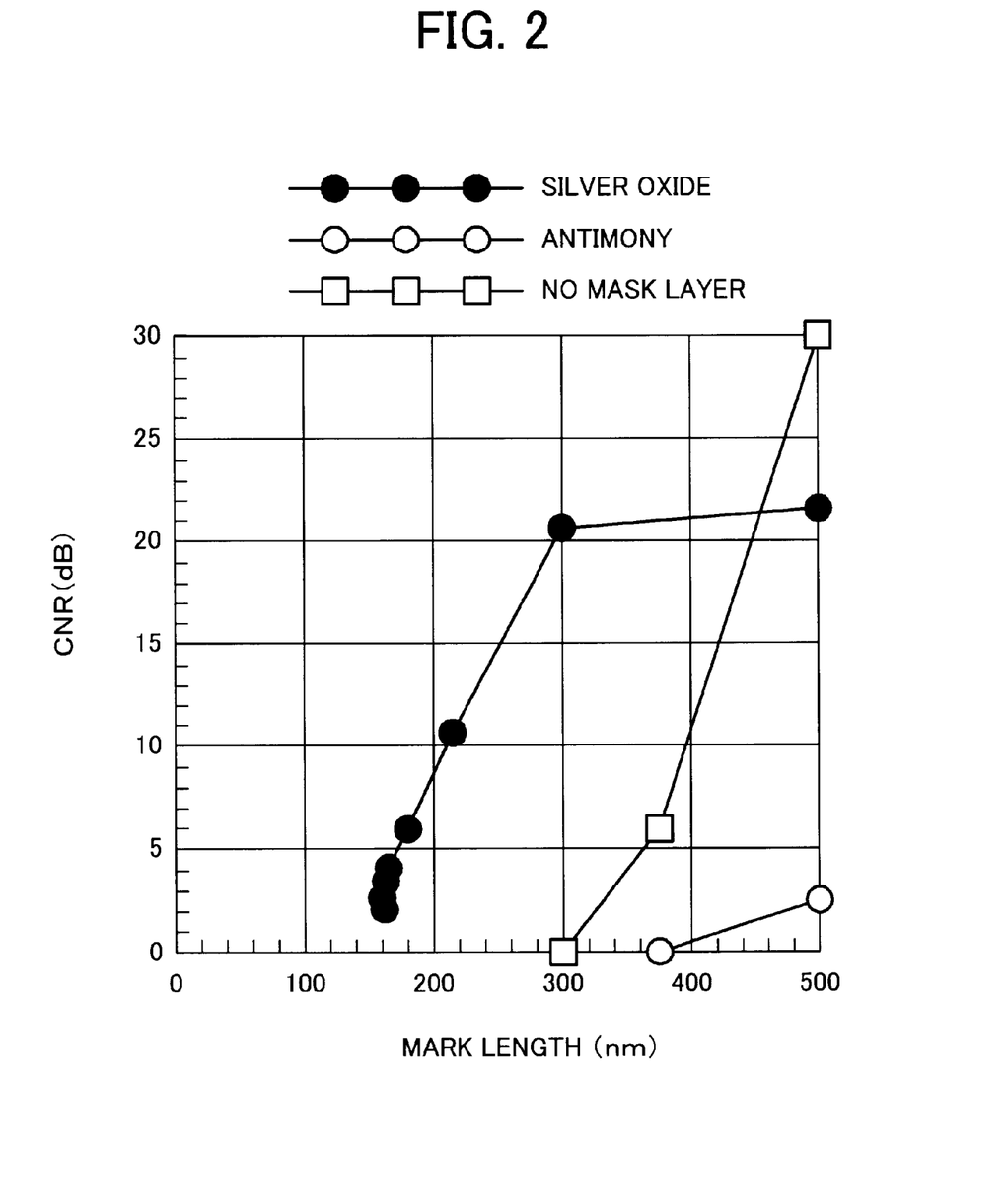
FIG. 2 is an explanatory diagram showing measured results with regard to the mark length dependency of C/N ratio in the optical recording medium of the present invention and the other optical recording mediums.
Figure 3:
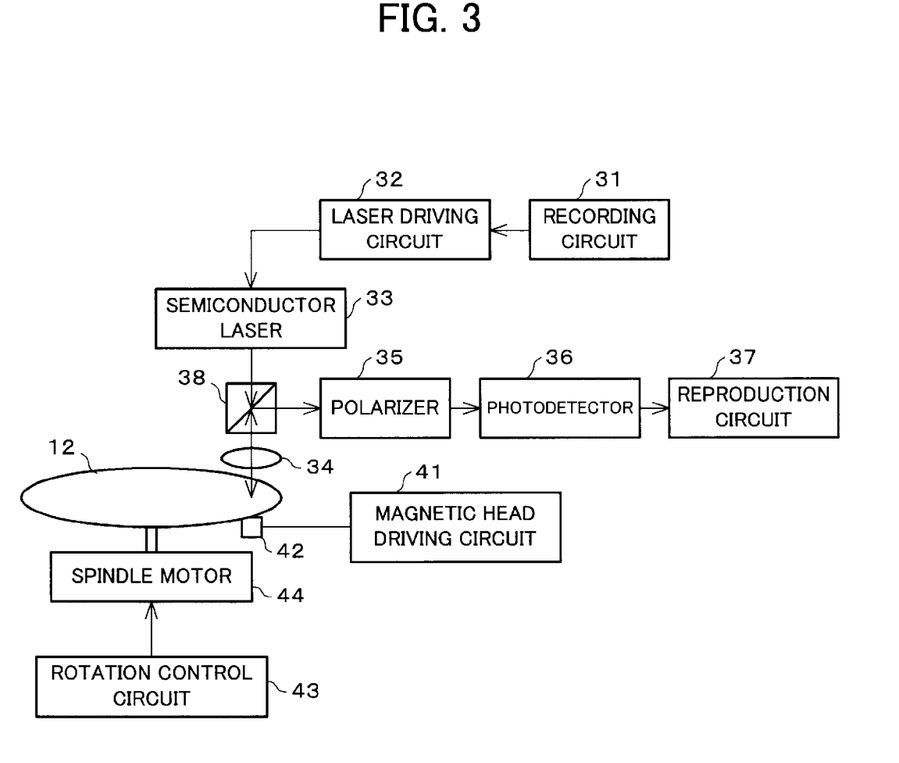
FIG. 3 is a block diagram showing a structure of an optical recording and reproduction apparatus in accordance with the present invention.

The following description deals with one embodiment of the present invention with reference to FIGS. 1 through 3.

An optical disk 12 (optical recording medium) in accordance with the present embodiment is arranged so that a first protection layer 14, a mask layer 15, a second protection layer 16, a recording layer 17, a third protection layer 18, and a reflection layer 19 are provided on a substrate 13 such as a polycarbonate substrate in this order (see FIG. 1).

A dielectric substance layer made of a material such as $ZnS$—$SiO_2$ is used as the first protection layer 14, the second protection layer 16, and the third protection layer 18, respectively. A magneto-optical recording layer made of a material such as TbFeCo as the recording layer 17. Silver oxide layer ($AgO_x$) is used as the mask layer 15. A thin film of silver is used as the reflection layer 19.

The first protection layer 14 has a thickness of 60 nm. The mask layer 15 has a thickness of 15 nm. The second and third protection layer 16 and 18 have a thickness of 25 nm, respectively. The recording layer 17 has a thickness of 25 nm. The reflection layer 19 has a thickness of 50 nm.

The magneto-optical recording layer is shown as an example of the recording layer 17. However, the present invention is not limited to this, provided that the recording layer 17 is a magnetic layer. Further, the present invention is not limited to the foregoing thickness of the recording layer 17. The present invention is not limited to the foregoing respective thicknesses and materials that show one example.

The following description deals with the operation of the mask layer 15 in the optical disk 12 having the foregoing structure. As shown in FIG. 1, upon receipt of the light beam 11 (laser beam) converged via an object lens (not shown), the mask layer 15 has a temperature distribution 21 based on the light beam 11 thus converged.

The silver oxide layer used as the mask layer 15 decomposes and the silver is deposited around the center portion of the light beam spot (laser spot) whose temperature is beyond a threshold temperature 22 in the temperature distribution 21. The deposition of the silver causes the index of refraction of such a portion to promptly change so as to provide in the mask layer 15 a scatterer 23 whose diameter is smaller than that of the light beam spot. This allows to generate a near-field light 25 around the scatterer 23.

Since the recording layer 17 is provided away from the mask layer 15 by a distance that is not more than a distance which allows the near-field light 25 to reach, the near-field light 25 interacts with the recording layer 17 and is scattered. One part of the scattered light (propagation light) is readout as the reflected light.

The optical disk 12 is rotated by a spindle motor 44 (see FIG. 3) as described later, and the light beam 11 scans on the optical disk 12. In the portion to which the light beam 11 is converged, the silver oxide layer decomposes to oxygen and silver with being sandwiched by the protection layer 14 and the protection layer 16. When the light beam 11 moves so that the light beam 11 is not converged to the above portion, the temperature of the portion becomes lower. This allows the oxygen and the silver to be recombined. Thus, when the light beam 11 moves on the optical disk 12 in response to the rotation thereof, the portion of the scatterer 23 moves so as to follow the light beam 11. This allows to reproduce by use of the near-field light 25 again and again.

Note that the light amount of the light beam 11 is the light amount of reproduction use that is less than the recording light amount that allows the magnetization of the recording layer 17 to be substantially zero and that does not affect the magnetization of the recording layer 17.

According to the present embodiment, a magneto-optical recording layer is used as the recording layer 17, and the light amount of the light beam 11 is increased up to the recording light amount, during the recording of a record mark 27, that allows the magnetization of the recording portion of the recording layer 17 to be substantially zero. Then, the external magnetic field is applied to the recording portion that has the substantially zero magnetization so as to reverse the magnetization of the recording portion, thereby carrying out the recording. Therefore, it is necessary during the recording to separately provide an external magnetic field in addition to the temperature rise by the light beam 11.

As has been described above, according to the optical disk 12, the external magnetic field is applied during the recording and the light beam of reproduction use having the light amount that does not affect the magnetization of the recording layer 17 during the reproduction while the external magnetic field, that has the amplitude of magnetic field with which no recording is carried out, is weakened or made to be zero. This ensures (1) to record the recording mark (recording information) during the recording, (2) to avoid the reversing of the magnetization during the reproduction, and (3) to avoid that the recorded mark is gradually erased. This is because (a) the mask layer 15 is raised up to the reproduction temperature during the reproduction, (b) the heat due to the temperature rise of the mask layer 15 causes the recording layer 17 to be raised to a degree but this does not cause the coercive force of the temperature rise portion to be reduced to a degree that the direction of the magnetization is reversed, and (c) it ensures to avoid that the direction of the magnetization is reversed because the external magnetic field is substantially zero. During this, the reflection layer 19 promotes the diffusion (radiation) of the heat, and further suppresses the temperature rise of the recording layer 17.

FIG. 1 shows the optical disk 12 having the reflection layer 19. However, the present invention is not limited to this. An optical disk 12 may not have such a reflection layer 19. Such an optical disk 12 having no reflection layer 19 is inferior to the optical disk 12 having the reflection layer 19 in the following points, i.e., (a) the point that the diffusion (radiation) of the heat is promoted and (b) the point that the temperature rise of the recording layer 17 is suppressed during the reproduction. However, as described above, it is possible to provide an optical recording medium that can avoid that the recorded signal in the portion other than the recorded mark 27 is erased and can carry out the reproduction again and again.

FIG. 2 shows the measured results of the mark length dependency of C/N ratio (Carrier to Noise Ratio) with respectively regard to (a) an optical disk in accordance with the present invention in which the magnetic layer is used as the recording layer and the silver oxide is used as the mask layer, and (b) two other optical disks, one of them is a conventional optical disk in which the material of phase transition type is used as the recording layer and the antimony is used as the mask layer, the other one is a conventional optical disk in which no mask layer is provided. A light beam (laser beam) having a wave length of 680 nm was used, an object lens had a numerical aperture of 0.55, and a relative linear velocity of the optical disk and the light beam spot was 3.0 m/s. When the limit of the optical recording density is indicated by [(wave length)/(4×(numerical aperture)], the limit becomes around 310 nm.

In the case of the conventional optical disk in which the material of phase transition type is used as the recording layer and the antimony is used as the mask layer, it was not possible to reproduce a recorded mark (high-density recorded mark) that is beyond the above limit (about 310 nm). This is because when the antimony is used as the mask layer, the reflectance thereof is high, thereby resulting in that a transparent aperture is generated around a high temperature portion that is located around the center when the light beam spot is converged to the mask layer (see, for example, Applied Physics Letters, vol. 73, no. 15, Oct. 12, 1998, pp. 2078–2080). This type relates to the formation of a transparent aperture. In contrast, the type of the present invention relates to the formation of a scatterer (the scatterer 23). The above two types are entirely different from each other.

In a conventional optical disk in which no mask layer is provided, it was possible to reproduce a relatively short recorded mark (relatively high-density recorded mark). However, like the conventional optical disk in which the antimony is used as the mask layer, it was not possible to reproduce a recorded mark (high-density recorded mark) that is beyond the above limit (about 310 nm).

In contrast, in the case of the optical disk in which the magnetic layer is used as the recording layer and silver oxide is used as the mask layer, it was possible to reproduce a recorded mark (high-density recorded mark) that is beyond the above limit (about 310 nm). Namely, as described above, compared with (a) the conventional optical disk in which the mask that generates the transparent aperture is provided and (b) the conventional optical disk in which no mask layer is provided, the optical disk of the present invention in which the mask layer generates a minute scatterer can particularly improve the recording density.

When comparing with a disk which has no reflection layer 19, the disk having the reflection layer 19 has much higher C/N ratio than that of the disk having no reflection layer 19. Accordingly, it is preferable to provide such a reflection layer 19 so as to increase the signal amount. Further, it is preferable that the material of the reflection layer 19 is silver. When the reflection layer 19 is made of silver, it is possible to excite the surface plasmon. This allows to further reinforce the near-field light so as to cause the increasing of the amount of the signal to be reproduced. This is a great advantage. The excitation of the surface plasmon is maximized when the silver is used. When using and combining with the mask layer 15 in which the scatterer is generated, the near-field interaction increases, thereby extremely increasing the reinforcement effect of the signal.

In FIG. 1, each thickness of the respective layers is as follows. The disk substrate 13 has a thickness of 0.6 mm, the first protection layer 14 has a thickness of 60 nm, the mask layer 15 has a thickness of 15 nm, the second protection layer 16 has a thickness of 25 nm, the recording layer 17 has a thickness of 25 nm, the third protection layer 18 has a thickness of 25 nm, and the reflection layer has a thickness of 50 nm. Especially, the second protection layer 16 was set so as to have a thickness equal to a distance which allows the near-field light 25 to arrive at the recording layer 17.

More concretely, it was suitable that the second protection layer 16 had a thickness of 10 nm to 100 nm. Such a thickness was set so that the equation $d=a \times \lambda/n$, where $\lambda$ indicates the wave length of the light beam, n indicates the index of refraction of the respective protection layers, a indicates a fixed number (1/30 to 1/3), and d indicates the thickness of the second protection layer.

It was suitable that the recording layer 17 had a thickness of 10 nm to 70 nm.

The material of the mask layer 15 is not limited to the silver oxide. The material may be other materials such as antimony oxide and terbium oxide. These other materials are preferable in the point of the mass production because these materials are easily made to be layers based on the method such as the sputtering, respectively. Each of these materials chemically decomposes at a temperature that is not less than a threshold temperature so that a metal is deposited and a scatterer having a high scattering efficiency is formed at high speed. Further, it is possible to obtain a high CNR compared with the case where the foregoing transparent aperture is formed.

The first protection layer 14 and the second protection layer 16 further function as a protector for avoiding that the chemical reaction of the silver oxide in the mask layer 15 destroys the substrate 13 and the recording layer 17. This allows the mask layer 15 to have a stable scatterer 23.

The following description deals with an optical recording and reproduction apparatus that records and reproduces the information with respect to the foregoing optical disk 12 with reference to FIG. 3.

According to the optical recording and reproduction apparatus, as shown in FIG. 3, a recording signal from a recording circuit 31 is sent to a laser driving circuit 32 in which a driving current is generated and is sent to a semiconductor laser 33 in an optical pickup. The semiconductor laser 33 outputs a recording light beam that varies depending on the driving current. The light beam is converged onto the optical disk 12 via a beam splitter 38 and an object lens 34 while it is subjected to the tracking and the focussing.

Concurrently, during the recording, a magnetic head driving signal that varies depending on the recording information is sent from a magnetic head driving circuit 41 to a magnetic head 42 in which a magnetic field that varies depending on the magnetic head driving signal is generated. Such a magnetic field is applied to the optical disk 12. This allows to reverse the direction of the magnetization of the portion, of the recording layer 17 in the optical disk 12, where the recording light beam is converged and the coercive force is substantially zero, thereby recording the information.

In contrast, during the reproduction, the magnetic field from the magnetic head 42 is reduced or made to be zero, a reproduction light beam having weak light amount is converged onto the optical disk 12 via a beam splitter 38 and an object lens 34 while it is subjected to the tracking and the focussing. Note that the weak light amount indicates the light amount which allows not to change the magnetization of the portion in the recording layer 17 to which the reproduction light beam is converged.

In such a case, the portion of the mask layer to which the reproduction light beam is converged has a temperature distribution 21 (see FIG. 1). In the case where silver oxide layer is used as the mask layer 15, the silver oxide decomposes to oxygen and silver so that the silver is deposited around the center portion of the light beam spot whose temperature is beyond a threshold temperature 22. This causes the index of refraction in the deposited portion to change so that the mask layer 15 has the scatterer 23 that is smaller than the diameter of the reproduction light beam spot so as to generate the near-field light 25 around the deposited portion. The near-field light 25 interacts with the recording layer 17 (the recording mark 27) and is scattered. One part of the scattered light (propagation light) is directed as the reflected light to a photodetector 36 via the beam splitter 38, the object lens 34, and a polarizer 35. The photodetector 36 converts the reflected light to an electric signal and sends it to the reproduction circuit 37 that reproduces the recorded information.

Note that the optical disk 12 is rotated by the spindle motor 44 (see FIG. 3), the reproduction light beam scans on the optical disk 12. In the portion (the portion that has a temperature of not less than the threshold temperature) to which the reproduction light beam is converged, as has been described above, the silver oxide decomposes to oxygen and silver while it is sandwiched by the first protection layer 14 and the second protection layer 16. And, in the portion, when the reproduction light beam moves so that the reproduction light beam is not converged to the portion, the temperature of the portion becomes lowered, thereby causing the silver and oxygen to be recombined to the original silver oxide. When the reproduction light beam moves on the optical disk 12 in response to the rotation of the optical disk 12, the portion in which the scatterer 23 is formed moves so as to follow the reproduction light beam. This allows to carry out the reproduction again and again by use of the near-field light 25.

In the optical recording and reproduction apparatus, the adjustment of the light amount is carried out by the laser driving circuit 32 so that the scatterer 23 is appropriately formed in the mask layer 15. The control signal sent from a rotation control circuit 43 is sent to the spindle motor 44 which rotates the optical disk 12 at a predetermined rotation number. According to the present embodiment, it was possible to record and reproduce the information when the rotation number is controlled so that the linear velocity falls within a range of 2 m/s to 16 m/s, for example.

By the way, in recent years, the recording and reproduction have been researched and developed with use of a semiconductor laser whose light frequency corresponds to the blue color. By shortening the wave length of light projected from the laser source, it is possible to carry out the high-density recording. Since the present embodiment uses the magnetic layer made of TbFeCo, the signal amount is suddenly reduced in the wave length range (not more than 500 nm) of such a semiconductor laser. This is because the Kerr rotation angle has a wave length dependency. In order to adapt the present invention to such a semiconductor laser, a magnetic layer made of GdFeCo is provided so as to be close to (in the vicinity of) the magnetic layer made of TbFeCo, for example. In the case where the recording and reproduction is carried out based on the reflected light, the magnetic layer made of GdFeCo is provided so as to be closer to the side of the light source than the magnetic layer made of TbFeCo. The magnetic layer made of GdFeCo has the effect that allows to copy the recorded mark of the magnetic layer TbFeCo. The magnetic layer made of GdFeCo allows to obtain a great Kerr rotation angle even to the wave length of the semiconductor laser whose light frequency corresponds to the blue color. Accordingly, when the recorded mark that has been copied to the magnetic layer made of GdFeCo is reproduced via a scatterer that has been generated in the mask layer by use of the semiconductor laser whose light frequency corresponds to the blue color, it is possible to carry out the recording and reproduction with higher-density. Note that the present invention is not limited to the above described materials. (a) A magnetic layer (TbFeCo according to the present embodiment) that has a great coercive force and a great magnetic anisotropy and (b) a magnetic layer (GdFeCo according to the present embodiment) that has a great magneto-optical effect in a short wave length may be used.

The first optical recording medium of the present invention, as described above, is provided with a substrate, a mask layer, provided on the substrate, whose index of refraction changes due to light or heat of the substrate, and a recording layer that is provided away from the mask layer by a distance that is not more than a distance which allows the near-field light to reach.

With the first optical recording medium, even when the temperature of the recording layer is raised during the reproduction, there is no reverse of magnetization in the recorded mark and the portions other than the recorded mark. This ensures to avoid that the recorded mark is gradually erased.

The second optical recording medium of the present invention, as described above, is characterized, in the first optical recording medium, in that the mask layer is made of silver oxide, antimony oxide, or terbium oxide.

With the second optical recording medium, silver oxide, antimony oxide, and terbium oxide chemically decompose so that a metal is deposited and a scatterer having a high scattering efficiency is formed at high speed, respectively. Further, it is possible to obtain a high CNR compared with the case where a transparent aperture is formed.

The third optical recording medium of the present invention, as described above, is characterized, in the first optical recording medium, in that a reflection layer is further provided away from the mask layer and the recording layer on an opposite side of an incident surface of a light beam.

With the third optical recording medium, the heat generated by the recording medium is promptly diffused (radiated) so as to further suppress that the recorded mark is erased.

An optical recording and reproduction apparatus in accordance with the present invention, uses an optical disk which includes a disk substrate; a mask layer that is provided on the disk substrate and changes in its index of refraction due to light or heat; and a recording layer that is provided away from the mask layer by a distance that is not more than a distance which allows the near-field light to reach, and in which the mask layer generates a minute opaque region in a light spot and the recording layer is a magnetic layer, and the apparatus is provided with (a) rotation means for rotating the disk, (b) optical means for converging a light beam onto the disk substrate, (c) light amount control means for controlling the light amount of the light beam so that the minute opaque region is provided, and (d) reproduction means for detecting a polarized component of the reflected light or the transmitted light so as to reproduce the information.

With the optical recording and reproduction apparatus, even when the temperature rise occurs in the recording layer during the reproduction, there is no reverse of magnetization in the recorded mark and the portions other than the recorded mark by turning off the application of an external magnetic field. This ensures to avoid that the recorded information is gradually erased.

An optical recording medium in accordance with the present invention, as described above, has (a) a mask layer that changes in its index of refraction at a temperature of not less than a threshold temperature and (b) a recording layer that is provided away from the mask layer by a distance that is not more than a distance which allows the near-field light to reach, the recording layer being a magnetic layer.

With the optical recording medium, since the recording layer is a magnetic layer, information is magnetically recorded. Accordingly, even when the distance between the mask layer and the recording layer is short so as to cause the thermal interference, the information that has been recorded is not affected. Namely, the information that has been recorded is not changed as long as a magnetic field is not applied thereto. This ensures to overcome the conventional deficiency that the information that has been recorded is gradually erased.

The reproduction of the information is carried out as follows. More specifically, when the mask layer has a temperature rise, the temperature rise portion whose temperature is not less than the threshold temperature changes in its index of refraction so as to generate the near-field light around the portion in which the index of refraction is changed. Since the recording layer is provided away from the mask layer by a distance that is not more than a distance which allows the near-field light to reach, the near-field light interacts with the recording layer and is scattered. The scattered light (propagation light) is partially reflected so as to generate the reflected light. The information is reproduced in accordance with the reflected light.

Note that when the temperature of the temperature rise portion becomes lower than the threshold temperature, the portion whose index of refraction has changed returns to the previous index of refraction (the original index of refraction). In response to the moving of the temperature rise portion in the mask layer, the portion whose index of refraction changes is moved. This allows to carry out the reproduction again and again by use of the near-field light.

It is preferable that the magnetic layer is a magneto-optical recording layer. In this case, the recording of the information is carried out as follows. More specifically, the temperature of a recorded portion is raised so that the coercive force of the magneto-optical recording layer becomes substantially zero. Then, an external magnetic field is applied so as to reverse the direction of the magnetization of the recorded portion. Thus, the recording of the information is carried out.

During the reproduction of the information, the information that has been recorded in the magneto-optical recording layer is not changed as long as the external magnetic field is not applied thereto, even when the distance between the mask layer and the recording layer is short so as to cause the thermal interference therebetween. Namely, even when the temperature rise occurs in the recording layer during the reproduction, there is no reverse of magnetization in the recorded portion and the portions other than the recorded portion as long as the external magnetic field is not applied. This ensures to avoid that the recorded information is gradually erased.

It is preferable that the mask layer is made of silver oxide, antimony oxide, or terbium oxide. These other materials are preferable in the point of the mass production because these materials are easily made to be layers based on the method such as the sputtering, respectively. Each of these materials chemically decomposes at a temperature that is not less than a threshold temperature so that a metal is deposited and a scatterer having a high scattering efficiency is formed at high speed. Further, it is possible to obtain a high CNR compared with the case where a transparent aperture is formed.

It is preferable that a heat radiation layer is further provided for radiating (diffusing) the heat of the recording layer. In this case, since the heat of the recording layer is radiated (diffused) by the heat radiation (diffusion) layer, the temperature rise of the recording layer is suppressed. This ensures that the recorded information of the recording layer is hard to be erased.

An optical recording and reproduction apparatus in accordance with the present invention, as described above, uses any one of the above-described optical recording medium and has (a) temperature rise means for raising the temperature of the optical recording medium, (b) temperature control means for controlling the temperature rise means so that the temperature rise during the reproduction is lower than that of the recording and so that the recording is not carried out with respect to the recording layer, (c) magnetic field generating means for generating a recording magnetic field that varies depending on the information to be recorded and applying the recording magnetic field to the optical recording medium, and (d) reproduction means for detecting a polarized component of light that has reflected from or transmitted through the optical recording medium so as to reproduce the information.

With the optical recording and reproduction apparatus, the magnetic field from the magnetic field generating means is applied to a target portion of the magnetic layer, thereby carrying out the recording. Meanwhile, during the reproduction, the temperature rise means is controlled by the temperature control means so that the temperature rise during the reproduction is lower than that of the recording. During this, the magnetization of the recording layer is not affected by the temperature rise. The temperature rise causes the index of refraction of the portion whose temperature is not less than the threshold temperature to change so that the near-field light is generated around the portion in which the index of refraction has changed. Since the recording layer is provided away from the mask layer by a distance that is not more than a distance which allows the near-field light to reach, the near-field light interacts with the recording layer and is scattered. The scattered light (propagation light) is partially reflected so as to generate the reflected light. The polarized component of the reflected light is detected by the reproduction means, thereby reproducing the information that has been recorded. Instead of the reflected light, the transmitted light may be detected to reproduce the information. During the reproduction, it does not occur that the magnetic field from the magnetic field generating means is applied to the optical recording medium.

Meanwhile, in the case where the magnetic layer is a magneto-optical recording layer, when the temperature rise occurs in the magneto-optical recording medium due to the temperature rise means, a portion, in the recording layer, whose coercive force becomes substantially zero occurs. When the magnetic field is applied to such a portion by the magnetic field generating means, the magnetization of such a portion is reversed, thereby carrying out the recording.

In contrast, the following procedure is carried out during the reproduction. More specifically, the temperature rise means is controlled by the temperature control means so that the temperature rise during the reproduction is lower than that of the recording. During this, the magnetization of the recording layer is not affected by the temperature rise. The temperature rise causes the index of refraction of the portion whose temperature is not less than the threshold temperature to change so that the near-field light is generated around the portion in which the index of refraction has changed. Since the recording layer is provided away from the mask layer by a distance that is not more than a distance which allows the near-field light to reach, the near-field light interacts with the recording layer and is scattered. The scattered light (propagation light) is partially reflected so as to generate the reflected light. The reproduction of the information is carried out in accordance with the reflected light. During the reproduction, it does not occur that the magnetic field from the magnetic field generating means is applied to the magneto-optical recording medium.

Accordingly, with the optical recording and reproduction apparatus, even when the distance between the mask layer and the recording layer is short so as to cause the thermal interference, the information that has been recorded is not affected because, during the reproduction, the magnetization of the recording layer is not affected by the temperature rise and the magnetic field from the magnetic field generating means is not applied to the magneto-optical recording medium. Namely, even when the temperature rise occurs in the recording layer during the reproduction, since the magnetization of the recording layer is not affected by the temperature rise and the magnetic field is not applied to the magnetic layer, there is no reverse of magnetization in the recorded portion and the portions other than the recorded portion. This ensures to overcome the conventional deficiency that the information that has been recorded is gradually erased.

There are described above novel features which the skilled man will appreciate give rise to advantages. These are each independent aspects of the invention to be covered by the present application, irrespective of whether or not they are included within the scope of the following claims.

What is claimed is:

1. An optical recording medium, comprising:

a mask layer that changes in its index of refraction at a temperature of not less than a threshold temperature; and a recording layer that is provided away from the mask layer by a distance that is not more than a distance which allows near-field light to reach, the recording layer being a magnetic layer.

2. The optical recording medium as set forth in claim 1, wherein the magnetic layer is a magneto-optical recording layer.

3. The optical recording medium as set forth in claim 2, wherein the mask layer is made of silver oxide, antimony oxide, or terbium oxide.

4. An optical recording medium as set forth in claim 3, further comprising a heat radiation layer that radiates heat generated by the recording layer.

5. An optical recording medium as set forth in claim 2, further comprising a heat radiation layer that radiates heat generated by the recording layer.

6. The optical recording medium as set forth in claim 1, wherein the mask layer is made of silver oxide, antimony oxide, or terbium oxide.

7. An optical recording medium as set forth in claim 6, further comprising a heat radiation layer that radiates heat generated by the recording layer.

8. An optical recording medium as set forth in claim 1, further comprising a heat radiation layer that radiates heat generated by the recording layer.

9. An optical recording medium as set forth in claim 1, further comprising a reflection layer that receives incident light and promotes heat radiation so as to suppress the temperature rise of the recording layer.

10. The optical recording medium as set forth in claim 9, wherein the reflection layer is made of silver.

11. An optical recording and reproduction apparatus, comprising:

(a) temperature rise means for raising the temperature of an optical recording medium, the optical recording medium including:

a mask layer that changes in its index of refraction at a temperature of not less than a threshold temperature; and a recording layer that is provided away from the mask layer by a distance that is not more than a distance which allows near-field light to reach, the recording layer being a magnetic layer, (b) temperature control means for controlling the temperature rise means so that temperature rise during reproduction is lower than that during recording and so that recording is not carried out with respect to the recording layer, (c) magnetic field generating means for generating a recording magnetic field that varies depending on information to be recorded, and for applying the recording magnetic field to the optical recording medium, and (d) reproduction means for detecting a polarized component of light that has reflected from or transmitted through the optical recording medium so as to reproduce the information.

12. The optical recording and reproduction apparatus as set forth in claim 11, wherein the magnetic layer is a magneto-optical recording layer.

13. The optical recording and reproduction apparatus as set forth in claim 10, wherein the mask layer is made of silver oxide, antimony oxide, or terbium oxide.

14. The optical recording and reproduction apparatus as set forth in claim 13, wherein a heat radiation layer that radiates heat generated by the recording layer is further comprised.

15. The optical recording and reproduction apparatus as set forth in claim 12, wherein a heat radiation layer that radiates heat generated by the recording layer is further comprised.

16. The optical recording and reproduction apparatus as set forth in claim 11, wherein the mask layer is made of silver oxide, antimony oxide, or terbium oxide.

17. The optical recording and reproduction apparatus as set forth in claim 16, wherein a heat radiation layer that radiates heat generated by the recording layer is further comprised.

18. The optical recording and reproduction apparatus as set forth in claim 11, wherein a heat radiation layer that radiates heat generated by the recording layer is further comprised.

19. An optical recording and reproduction apparatus as set forth in claim 11, further comprising a reflection layer that receives incident light and promotes heat radiation so as to suppress the temperature rise of the recording layer.

20. The optical recording and reproduction apparatus as set forth in claim 19, wherein the reflection layer is made of silver.

* * * * *